US010250453B1

(12) United States Patent
Singh et al.

(10) Patent No.: US 10,250,453 B1
(45) Date of Patent: Apr. 2, 2019

(54) SYSTEM FOR SUPPORTING A MULTI-TENANT DATA ARCHITECTURE

(71) Applicant: INTUIT INC., Mountain View, CA (US)

(72) Inventors: Servesh Pratap Singh, Bangalore (IN); Ritesh N. Jain, Bangalore (IN); Smita Shankar, Bangalore (IN)

(73) Assignee: INTUIT INC., Mountain View, CA (US)

( * ) Notice: Subject to any disclaimer, the term of this patent is extended or adjusted under 35 U.S.C. 154(b) by 1164 days.

(21) Appl. No.: 13/748,492

(22) Filed: Jan. 23, 2013

(51) Int. Cl.
*G06F 3/00* (2006.01)
*H04L 12/24* (2006.01)
*G06F 3/01* (2006.01)

(52) U.S. Cl.
CPC .................... *H04L 41/22* (2013.01)

(58) Field of Classification Search
CPC ........... G06F 17/30557; G06F 21/6218; G06F 3/048; G06F 17/30; G06F 8/24; G06F 9/45558; G06F 9/50; G06F 3/067; G06F 2009/4557
USPC ......................................................... 715/741
See application file for complete search history.

(56) References Cited

U.S. PATENT DOCUMENTS

| | | | | |
|---|---|---|---|---|
| 7,289,964 | B1 * | 10/2007 | Bowman-Amuah | G06F 9/5038 705/1.1 |
| 8,566,301 | B2 * | 10/2013 | Rueben | G06T 1/00 707/705 |
| 8,943,075 | B1 * | 1/2015 | Maiorano | G06F 8/65 707/755 |
| 9,619,256 | B1 * | 4/2017 | Natanzon | G06F 9/45533 |
| 9,965,306 | B1 * | 5/2018 | Natanzon | G06F 9/45558 |
| 10,025,627 | B2 * | 7/2018 | Ferris | G06F 9/50 |
| 2004/0054569 | A1 * | 3/2004 | Pombo | G06Q 10/0633 705/7.27 |
| 2008/0052371 | A1 * | 2/2008 | Partovi | G06Q 10/10 709/217 |
| 2008/0147470 | A1 * | 6/2008 | Johri | G06Q 10/063114 379/265.11 |
| 2009/0069912 | A1 * | 3/2009 | Stefik | G06F 17/30761 700/94 |
| 2009/0144741 | A1 * | 6/2009 | Tsuda | G06F 9/5027 718/104 |
| 2009/0254838 | A1 * | 10/2009 | Rao | G06F 17/30702 715/749 |
| 2010/0180213 | A1 * | 7/2010 | Karageorgos | G06F 17/243 715/753 |

(Continued)

*Primary Examiner* — Nicholas Augustine
(74) *Attorney, Agent, or Firm* — Patterson + Sheridan, LLP

(57) ABSTRACT

One embodiment of the present invention relates to a system that enables a single software application instance to support multiple tenants, wherein each tenant is associated with a separate database. First, the software application instance receives an input, wherein the input requires an operation to be performed on a database of one of the supported tenants. Next, the software application instance identifies the tenant with which the input is associated. The software application instance then obtains a context associated with the tenant. From the context, the software application instance obtains a service object. Finally, the software application invokes a method provided by the service object's class. This enables a data access object, which is encapsulated within the service object, to perform the operation on the database.

15 Claims, 4 Drawing Sheets

(56) References Cited

U.S. PATENT DOCUMENTS

| | | | | |
|---|---|---|---|---|
| 2010/0192072 A1* | 7/2010 | Spataro | G06Q 10/107 | 715/753 |
| 2010/0205541 A1* | 8/2010 | Rapaport | G06Q 10/10 | 715/753 |
| 2011/0106662 A1* | 5/2011 | Stinchcomb | G06Q 30/06 | 705/26.43 |
| 2011/0219046 A1* | 9/2011 | Nesmyanovich | G06F 17/30 | 707/812 |
| 2011/0231912 A1* | 9/2011 | Lee | G06F 21/33 | 726/7 |
| 2012/0078953 A1* | 3/2012 | Araya | G06F 17/30979 | 707/769 |
| 2012/0096041 A1* | 4/2012 | Rao | G06F 17/30867 | 707/794 |
| 2012/0102402 A1* | 4/2012 | Kwong | G06F 3/038 | 715/705 |
| 2012/0130973 A1* | 5/2012 | Tamm | G06F 17/30545 | 707/706 |
| 2012/0173483 A1* | 7/2012 | Hartig | G06F 9/4856 | 707/610 |
| 2012/0221683 A1* | 8/2012 | Ferris | H04L 12/4641 | 709/218 |
| 2012/0226803 A1* | 9/2012 | Bharadwaj | H04L 41/0253 | 709/224 |
| 2012/0233137 A1* | 9/2012 | Jakobson | G06F 17/30 | 707/695 |
| 2012/0278725 A1* | 11/2012 | Gordon | H04N 21/2665 | 715/738 |
| 2012/0304307 A1* | 11/2012 | Ramesh | G06Q 10/06 | 726/28 |
| 2013/0031496 A1* | 1/2013 | Mathrubootham | G06F 3/048 | 715/764 |
| 2013/0055118 A1* | 2/2013 | Donovan | G06F 17/30289 | 715/763 |
| 2013/0262510 A1* | 10/2013 | Smith | G06F 17/30283 | 707/770 |
| 2013/0275509 A1* | 10/2013 | Micucci | H04L 67/02 | 709/204 |
| 2014/0012826 A1* | 1/2014 | Wisman | G06F 17/3023 | 707/695 |
| 2014/0047201 A1* | 2/2014 | Mehta | G06F 13/00 | 711/158 |
| 2014/0123243 A1* | 5/2014 | Lee | G06F 21/6245 | 726/4 |

* cited by examiner

SYSTEM FOR SUPPORTING A MULTI-TENANT DATA ARCHITECTURE

BACKGROUND

Related Art

The present invention generally relates to techniques for supporting multi-tenant data architecture through a software application.

A software company can make a software application available to different parties (referred to as "tenants") in a client-server architecture by enabling tenant-affiliated users to interact with the software application through a web browser. Here, the users would access tenant-specific data that is stored within the software application by interacting with the software application's graphical user interface (GUI), which is presented through the web browser. Meanwhile, the software application would store tenant-specific data in an underlying database. As a result, this software application allows multiple users associated with multiple tenants to work with tenant-specific data via the software application.

Unfortunately, there are a number of challenges in implementing such a system. One challenge is that different tenants do not store identical forms of data, and often require dissimilar tables and associated column structures. The more tenants a software application services, the less likely a single database schema can efficiently provide all the tables and column structures required by all tenants. One possible alternative is to provide a separate software application for each tenant. However, this approach quickly becomes unscalable as the number of tenants increases.

SUMMARY

One embodiment of the present invention relates to a system that enables a single software application instance to support multiple tenants, wherein each tenant is associated with a separate database. First, the software application instance receives an input, wherein the input requires an operation to be performed on a database of one of the supported tenants. Next, the software application instance identifies the tenant with which the input is associated. The software application instance then obtains a context associated with the tenant. From the context, the software application instance obtains a service object. Finally, the software application invokes a method provided by the service object's class. This enables a data access object, which is encapsulated within the service object, to perform the operation on the database.

In some embodiments of the present invention, the software application instance may provide a user interface for users associated with one of the supported tenants.

In some embodiments of the present invention, the software application may receive the input from the user through a web browser, which is executing on a client and interacting with the user interface.

In some embodiments of the present invention, the software application instance may perform the following additional actions prior to receiving the input. First, the software application instance may receive the user's username and password from the browser, wherein the username includes an identifier for the tenant. The software application instance may then extract the identifier from the username. Next, the software application instance may use the identifier to retrieve the context that is specific to the tenant. Next, the software application may store the context in the user's session. Finally, the software application instance may render the user interface to be specific for the tenant.

In some embodiments of the present invention, identifying the tenant with which the input is associated may comprise extracting the context from the user's session while receiving the input from the user.

In some embodiments of the present invention, the service object may be tenant-agnostic. Additionally, an inversion of control (IoC) container may have automatically injected the data access object as a dependency into the service object.

In some embodiments of the present invention, the data access object may be specific to a tenant. Additionally, the data access object may interface directly with the database.

In some embodiments of the present invention, a company provides the software application instance. Meanwhile, the tenant may be an external customer of the company wherein the customer uses the database to store the customer's data. Alternatively, the tenant may be a client application that is internal to the company, wherein the client application uses the database to store data specific to the client application.

DETAILED DESCRIPTION

Figure 1:
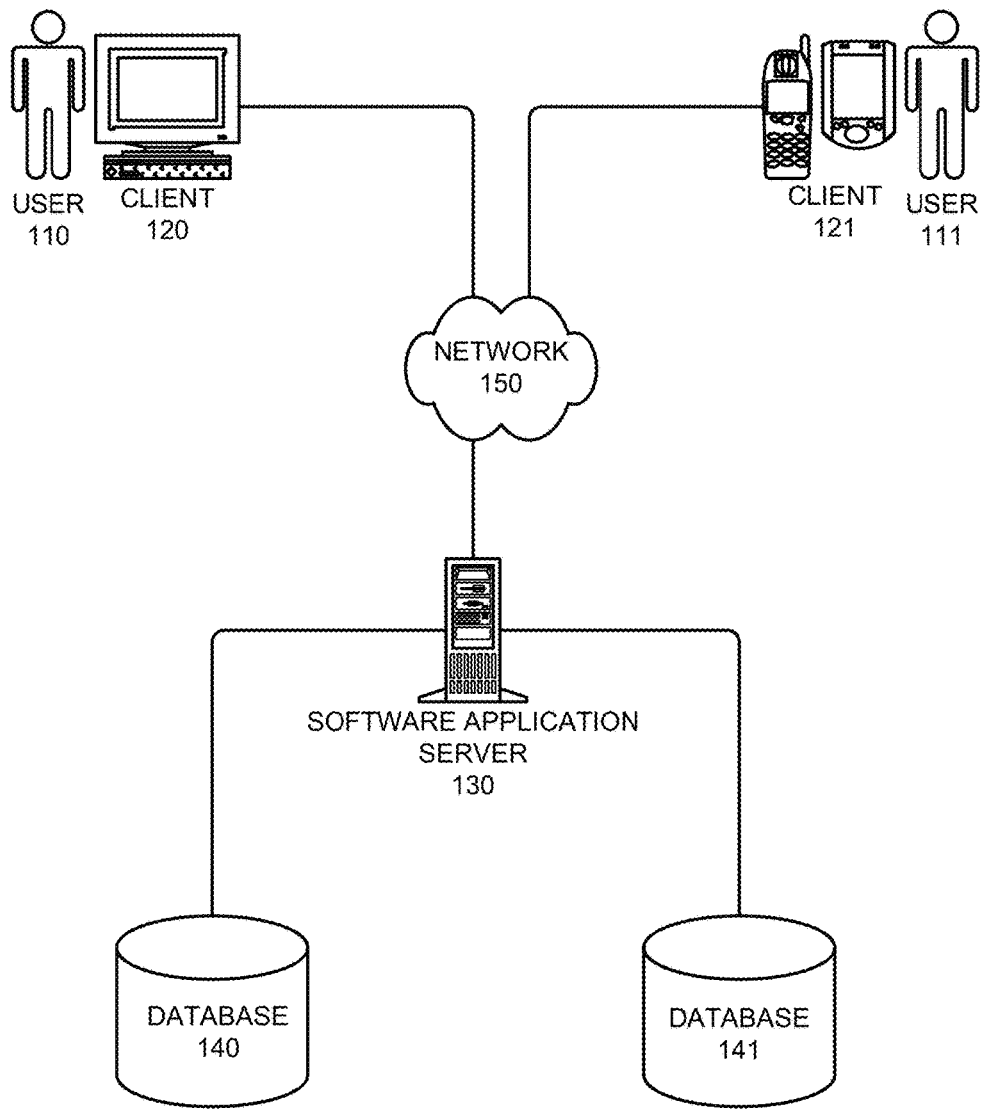
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

By extending the use of the inversion of control (IoC) pattern, embodiments of the present invention enable a single instance of a software application to work with multiple databases while keeping the resulting complexity of the software application's data access layer from spilling into the business logic layer. In other words, the developer cost required for adding support for a new tenant is minimized because major changes to the software application's code are limited to the data access layer. The software application may be a web application or a data management tool provided by a software company to numerous tenants. Moreover, the tenants may be external or internal to the company. Examples of internal tenants comprise paying customers and cooperating partners of the software company. Examples of external tenants comprise client applications, developed within the company, that are using the software application as an internal data management tool. Here, "business logic layer" generally refers to classes, interfaces, and entities that reflect real world business activities or behaviors. Conversely, "data access layer" refers to classes and entities whose main role is to provide simplified access to data stored in persistent storage, such as a database.

Embodiments of the present invention provide various advantages. By using embodiments of the present invention, a software company may develop a software application that can interface with multiple databases. This may be useful for companies that provide multiple discreet web services to end users, wherein data stored by one web service possesses a different format from the data of the other, thus requiring each web service to use its own database. In situations where a software company wants to develop administrative tools to manage data stored in these databases, the software company may develop a single administrative tool to manage all databases, rather than a single tool for each database. Not only does this save the software company in developer time and costs, but also a single centralized administrative tool for all databases makes it more convenient for company tech support to manage disparate databases. The databases themselves can be from different vendors as well. For example, even if one web service uses a MySQL database while another uses an Oracle database, the tool can interface with both.

One embodiment of the present invention provides a system that enables a single software application instance to support multiple tenants, wherein each tenant is associated with a separate database. Note that this software application instance may be a web application that is made available to external clients across the Internet. Alternatively, this software application may be available only to departments or client applications internal to the company through the company's private intranet. First, the software application instance receives an input, wherein the input requires an operation to be performed on a database of one of the supported tenants. Examples of said input include, but are not limited to, a mouse click on a button of a web GUI, a key press on a keyboard, a scheduled trigger, the receipt of a file, and a logged error. Next, the software application instance identifies the tenant with which the input is associated. Examples of said tenant include, but are not limited to, a business client, an internal company department, an internal client application, an external business partner, and end users. The software application instance then obtains a context associated with the tenant. Note that a context may be an instance of the BeanFactory class or the ApplicationContext class, wherein both classes are defined in the Spring Framework for enterprise Java. From the context, the software application instance obtains a service object. Finally, the software application invokes a method provided by the service object's class. This enables a data access object, which is encapsulated within the service object, to perform the operation on the database.

In some embodiments of the present invention, the software application instance may provide a GUI for users associated with one of the supported tenants. Note that the GUI may be the frontend of a web application, wherein the GUI is composed of HyperText Markup Language (HTML) and Javascript. The GUI may also be part of a native desktop application that executes on a user's client machine, wherein the native desktop application communicates with the software application instance over a network.

In some embodiments of the present invention, the software application may receive the input from the user through a web browser. The user may be associated with a specific tenant. Examples of a user include, but are not limited to, an employee of a tenant such as a database administrator or a technical support specialist. Meanwhile the browser may be executing on a client and interacting with the user interface.

In some embodiments of the present invention, the software application instance may perform the following additional actions prior to receiving the input. First, the software application instance may receive the user's username and password from the browser, wherein the username includes an identifier for the tenant. For example, the user may provide "exampleUser@exampleTenant" as a username string. The software application instance may then extract the identifier from the username. Continuing from the above example, "exampleTenant" would be the identifier that points to a supported tenant. Next, the software application instance may use the identifier to retrieve the context that is specific to the tenant. Note that the software application context may store contexts for all supported tenants in a hash table singleton. Here, the software application would use the identifier "exampleTenant" as a key to retrieve the correct application context from the hash table. Next, the software application may store the context in the user's session. Note that the software application context may serialize the context into a cookie and store the cookie in the user's browser. Finally, the software application instance may render the user interface to be specific for the tenant.

In some embodiments of the present invention, identifying the tenant with which the input is associated may comprise extracting the context from the user's session while receiving the input from the user. Note that the software application instance may retrieve the context from the user's session by decrypting the cookie found in the user's web browser.

In some embodiments of the present invention, the service object may be tenant-agnostic. Note that the service object may be an instance of a service layer class written in Java, wherein the service object provides methods that are both meaningful to the business layer and free of implementation details. For example, the service object that is used to access a table that contains user entries in a database based on the Oracle relational database management system (RDBMS) may expose methods such as "getUser", "createUser", and "removeUser". Additionally, an inversion of control (IoC) container may have automatically injected the data access object as a dependency into the service object. Note that with Spring bean binding XML files, the Spring Framework is capable of acting as an IoC container that automatically injects dependencies into a Java object at the Java object's creation. In this example, the Spring Framework may inject the data access object into the service object.

In some embodiments of the present invention, the data access object may be specific to a tenant. Note that the data access object may be an instance of a data access layer class written in Java, wherein the data access object provides methods that are specific to a particular implementation of the service object's interface. Returning to the above example, a data access object that corresponds to the aforementioned service object may provide methods such as "getUserFromOracleDB", "createUserInOracleDB", and "removeUserFromOracleDB", wherein the aforementioned methods reveal an implementation detail: the methods are specific to an Oracle RDBMS. Isolating implementation details from the business logic layer results in more highly decoupled code, which translates to easier maintenance and extensibility of the code. Additionally, the data access object may interface directly with the database. Note that the software application instance may use the data access object to retrieve table entries from the database and inflate the entries into Java Persistence API (JPA) entity objects. During the software application's writing, developers may create a JPA entity class for each table found in the table. Here, instances of a JPA entity class may represent entries from the corresponding database table.

In some embodiments of the present invention, a company provides the software application instance. Meanwhile, the tenant may be an external customer of the company wherein the customer uses the database to store the customer's data. Alternatively, the tenant may be a client application that is internal to the company, wherein the client application uses the database to store data specific to the client application.

Computing Environment

FIG. 1 illustrates the computing environment 100 of a software application user 110 in accordance with an embodiment of the present invention. Computing environment 100 includes a number of computer systems, which can include any type of computer system based on a microprocessor, a mainframe computer, a digital signal processor, a portable computing device, a personal organizer, a device controller, or a computational engine within an appliance. More specifically, referring to FIG. 1, computing environment 100 includes users 110 and 111, client devices 120 and 121, software application server 130, and databases 140 and 41.

Users 110 and 111 may include individuals; groups of individuals; organizations; groups of organizations; computing systems; groups of computing systems or other entities that can interact with computing environment 100. Users 110 and 111 may also be affiliated with one of a number of tenants supported by the software application running on software application server 130.

Client devices 120 and 121 may include any device that includes computational capability such as PDAs, tablet computers, laptops, desktops, smartphones, and cell phones.

Software application server 130 may include any node on a network whose task is to support a web application that interacts with web browsers running on remote client devices. Software application server 130 can participate in an advanced computing cluster or can act as a stand-alone server.

Databases 140 and 141, which interact with software application server 130, may include any type of system for storing data in non-volatile storage. This includes, but is not limited to, relational database management systems, text files, XML files, and spreadsheets. This also includes, but is not limited to, systems based upon magnetic, optical, or magneto-optical storage devices, as well as storage devices based on flash memory and/or battery-backed up memory. Note that databases 140 and 141 may exist alongside the software application within software application server 130 or in separate physical database servers. Also, note that database 140 may contain data specific to the tenant user 110 is affiliated with while database 141 may contain data specific to the tenant user 111 is affiliated with.

Network 150 may be a private company-wide intranet or the Internet itself.

Note that different embodiments of the present invention may use different system configurations, and are not limited to the system configuration illustrated in computing environment 100.

System

Figure 2:
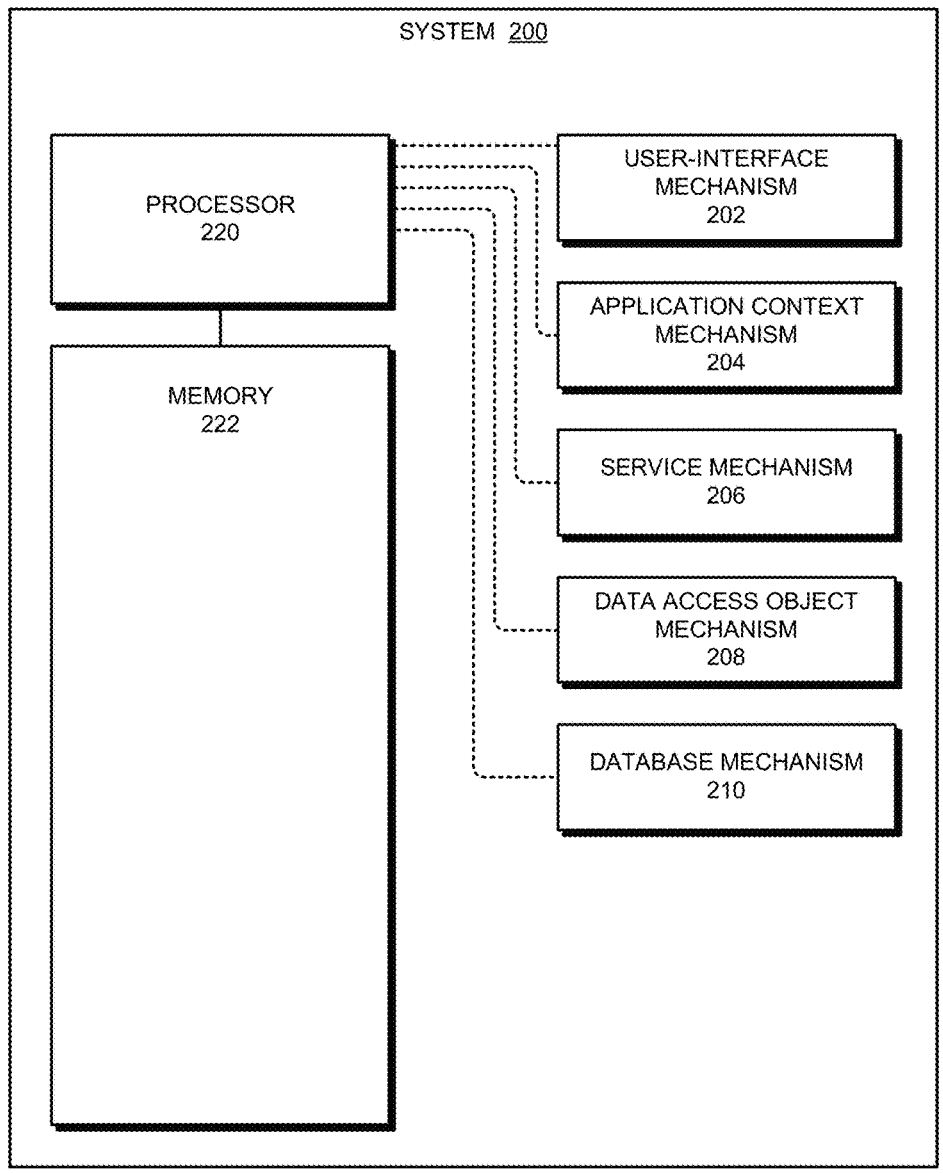
FIG. 2 illustrates a system in accordance with an embodiment of the present invention.

FIG. 2 illustrates a system 200 in accordance with an embodiment of the present invention. As illustrated in FIG. 1, client system 200 can comprise client device 120, software application server 130, databases 140 and 141, or any combination thereof. System 200 can also include user interface mechanism 202, application context mechanism 204, service mechanism 206, data access object mechanism 208, database mechanism 210, processor 220, and memory 222.

Accessing Tenant-Specific Data

Figure 3:
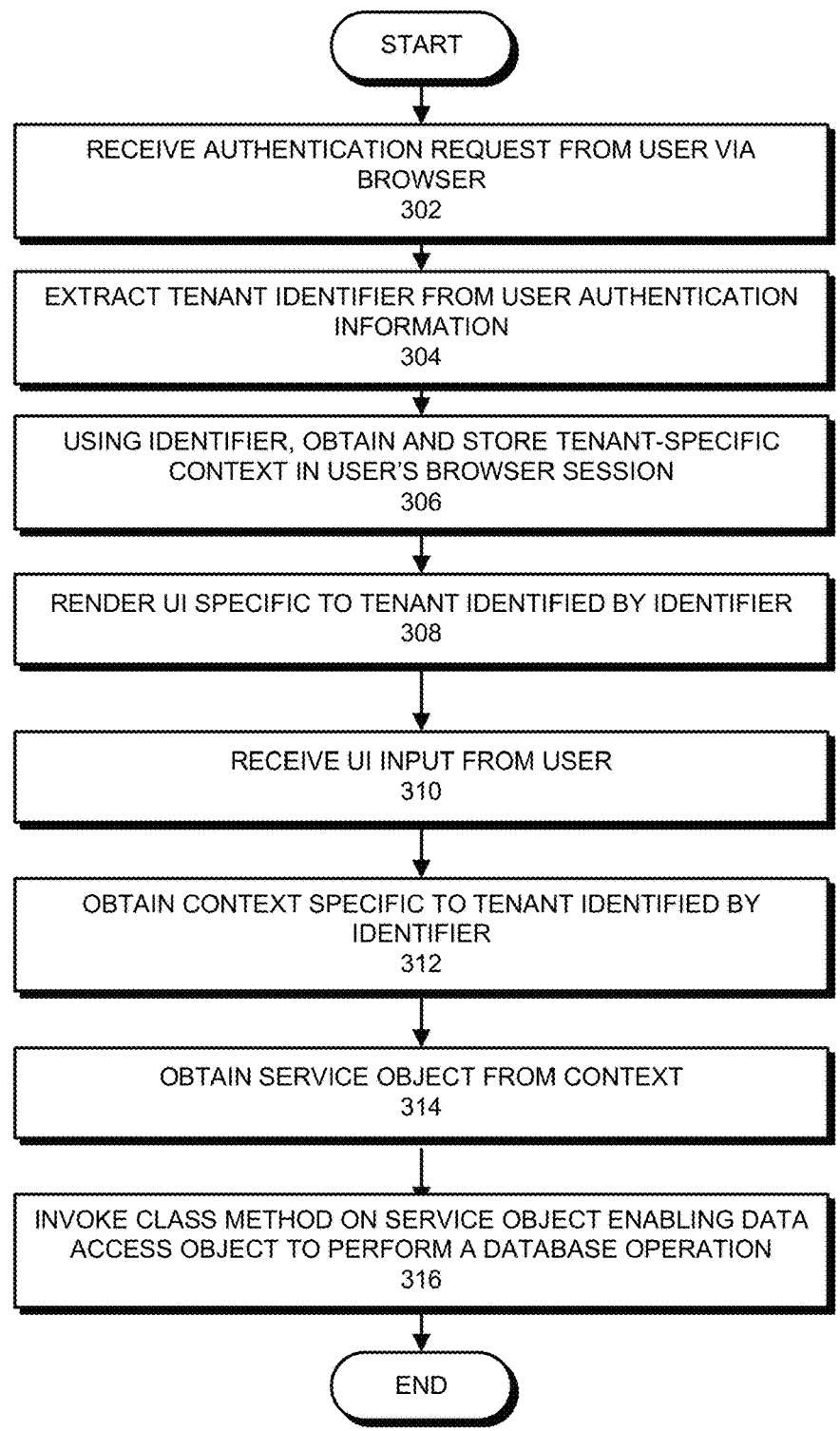
FIG. 3 presents a flow chart illustrating the process of forwarding the input of a tenant-affiliated user to a tenant-specific database underlying the software application in accordance with an embodiment of the present invention.

FIG. 3 presents a flow chart illustrating the process of a tenant-affiliated user accessing tenant-specific data from a software application that supports multi-tenancy.

Initially, the software application receives an authentication request from a user that is affiliated with one of the tenants supported by the software application, wherein the user interacts with the software application through a web browser that executes on her client device (operation 302). For example, suppose a financial software developer supports two similar web applications: QD and Mint™. Further, suppose that information technology (IT) personnel within the company use a single graphical administrative tool to manage both data specific to QD and data specific to Mint™. In this example, the financial software developer developed QD as its flagship web application and only acquired Mint™ via a merger with a competing developer. QD and Mint™ are similar in that (1) they both provide services to online users over the web, (2) they both allow users to manage their personal financial data online, (3) users interact with both web applications via web browsers, and (4) they both work with an entity type called "channel". Despite their similarities, the database schemas used by QD and Mint™ are not identical. For example, the Mint™ channel entity type defines a column called "SCRIPT ID." Meanwhile, this column does not exist in the QD channel entity type. In other words, QD and Mint™ share conceptual similarities but differ in implementation. Consequently, while QD and Mint must run on separate databases, developing separate administrative tools to manage QD data and Mint™ data would be a waste of time and resources.

In this example, QD uses database 140 while Mint™ uses database 141. Meanwhile, the administrative tool, which is written in the Java programming language, runs on software application server 130. User 110 is an IT specialist that is assigned to oversee Mint™ data. User 111, on the other hand, is another IT specialist that is assigned to oversee QD data. In order to perform a routine checkup on the Mint™ web application, user 110 accesses the administrative tool, across company network 150, via a browser executing on client 120. The administrative tool GUI (user-interface mechanism 202), which is composed of Java Server Pages (JSP), presents user 110 with a login prompt. User 110 enters "user110@mint" and her password. The administrative tool GUI receives this information in the form of an authentication request.

Once the authentication request is received, the software application extracts a string-based identifier from the information provided via the authentication request, wherein the string-based identifier identifies the tenant the user is affiliated with (operation 304). Continuing from the preceding example, the administrative tool's JSP-based GUI forwards the authentication request to an action handler LoginHandler, which invokes the Java method validateUserData, a member method of the class DashLoginModule. After verifying that user 110's username and password are correct, validateUserData extracts the string identifier "mint" from the authentication request.

After extracting the identifier from the request, the software application uses the identifier to retrieve the tenant-specific context and stores the context in the user's session in the browser (operation 306). Continuing from the preceding example, validateUserData validates the identifier "mint" and finds that "mint" refers to the Mint™ web application, which is one of the two tenants of the administrative tool (the other being QD). More specifically, the administrative tool can use this identifier to retrieve an application context (application context mechanism 204) that is specific to the Mint™ web application.

Note that the administrative tool was written as a Java application that uses the Spring Framework, which is an IoC container for the Java platform. Without IoC, a Java class instance generally defines its own dependencies via a class constructor or through the invocation of a factory method. IoC "inverts" this paradigm by allowing the container, such as the Spring Framework, to automatically "inject" independencies into a class instance at the time of the instance's creation. Use of IoC results in code that is cleaner and more highly decoupled, which translates to easier maintenance and extensibility of the code. In the Spring Framework, IoC is commonly configured through Spring bean binding XML files. For instance, developers of the administrative tool created two Spring bean binding XML files: "Spring.dash.service.context-mint.xml" for Mint™ and "Spring.dash.service.contextqd.xml" for QD. Later, when the administrative tool starts up on software application server 130, a loader class, ServicesSpringContextLoader, creates the Mint™ application context from the former XML file and the QD application context from the latter. Note that the Mint™ application context is the application context that the administrative tool used the string identifier "mint" to retrieve. With the Mint™ application context in hand, the administrative tool can forward user 110's future inputs to the Mint™ database. For now, the administrative tool serializes the application context into an encrypted cookie and stores the cookie in user 110's web browser.

Once the context has been stored in the user's session, the software application can now render a UI that is specific to the tenant referred to by the identifier (operation 308). Continuing from the preceding example, the handler module forwards user 110 to a dynamic JSP-based web page that displays Mint's status. The Mint™ status page displays to user 110 Mint's Mint™ uptime, any critical errors, and buttons that allow user 110 to view the Mint™ contents of various tables in Mint's database tables when clicked. Clicking on one of these buttons, the "Channel" button, will cause the status page to display a list of all "Channel" entities in the Mint™ database.

After the UI has been rendered for the user to interact with, the software application receives a UI input from the user, wherein the UI input requires an operation to be performed on a database that is specific to a tenant (operation 310). Continuing from the preceding example, user 110 moves his mouse cursor to the "Channel" button displayed in the UI and clicks it. In order to display all channel entities in Mint's database, the administrative tool will need to perform a "GET" operation on Mint's database. As a result, user 110's click input produces a request that is forwarded to another action handler ListChannelHandler.

In order to convert the UI input into an operation on the correct database, the software application first obtains an application context that is specific to the tenant (operation 312). Continuing from the preceding example, ListChannelHandler extracts the application context from the encrypted cookie previously stored in user 110's web browser.

The software application then obtains a tenant-agnostic service object from the context (operation 314). Continuing from the preceding example, the application tool uses the string "IMChannelServices" as a key to obtain the service object (service mechanism 206) from the application context. Note that this service object is an instance of the IMChannelServicesImpl class, which implements the IMChannelServices interface. While the interface IMChannelServices is completely tenant-agnostic, objects of the class IMChannelServicesImpl encapsulate a tenant-specific data access object (data access object mechanism 208) that was automatically injected via IoC. Thus, at the time of the service object's creation, the Spring Framework injects an instance of the class IMChannelDAOImpl inside the service object, wherein IMChannelDAOImpl resides within the Mint-specific Java package: com.intuit.ds.dash.im.dao.mint.impl.

Finally, the software application invokes a class method on the tenant-agnostic service object, which causes a data access object, which is encapsulated within the service object, to perform the database operation (operation 316). Continuing from the preceding example, the application tool invokes a first class method IMChannelServices.getChannel. Then, the first class method invokes a second class method IMChannelDAOImpl.getChannel on the IMChannelDAOImpl instance encapsulated by the service object. The second class method performs a GET operation on the Channel table inside the Mint™ database (database mechanism 210) and inflates the retrieved entries into Java Persistent API (JPA) entity objects of the class ChannelDTO. Eventually, the administration tool returns the entity objects to ListChannelHandler, which renders a UI that displays the list of "Channel" entities to user 110.

Architecture Diagram

Figure 4:
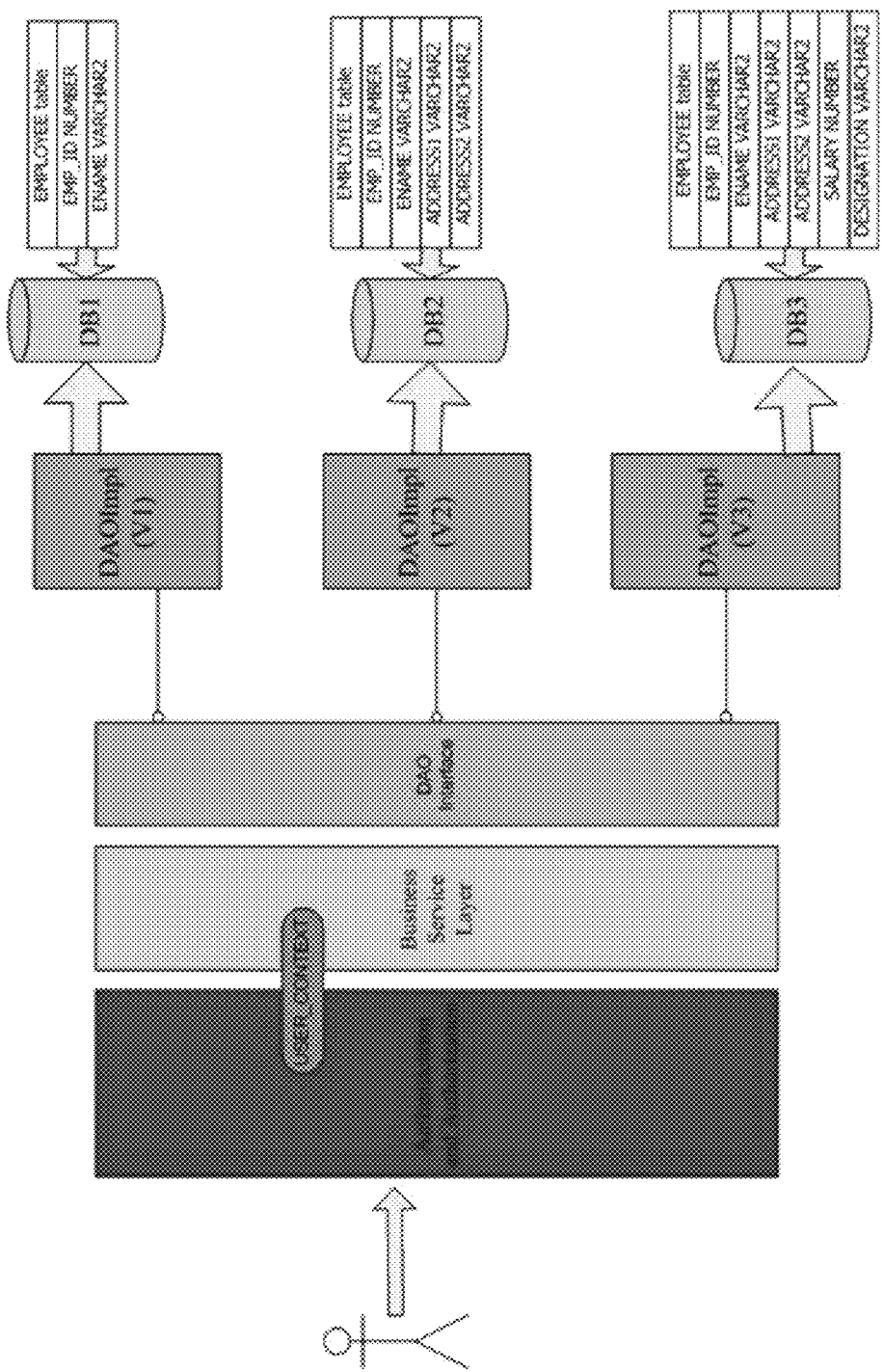
FIG. 4 presents a software architecture diagram illustrating the relationships among the authentication layer, the business logic layer, the data access objects, and the databases.

FIG. 4 presents a software architecture diagram illustrating the relationships among the authentication layer, the business logic layer, the data access objects, and the databases. The authentication layer may be part of the GUI. The business logic layer can be referred to as the service layer.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
receiving an authentication request from a user affiliated with a tenant, wherein each tenant in a set of tenants is associated with a separate database in a set of databases, and further wherein the authentication request includes an identifier corresponding to the tenant;
extracting the identifier from the authentication request;
retrieving a tenant-specific context from a hash table based on the identifier;
rendering a tenant-specific user interface to the user based on the identifier;
receiving an input from the user, wherein the input requires an operation to be performed on a database associated with the tenant in the set of databases;
obtaining, from the tenant-specific context, a tenant-agnostic service object that comprises:
a first set of class methods corresponding to a set of tenant-agnostic operations for performing on any of the set of databases; and
a tenant-specific data access object comprising a second set of class methods corresponding to a set of operations specific to the database associated with the tenant;
invoking, on the tenant-agnostic service object, a first class method from the first set of class methods;
invoking, on the tenant-specific data access object, a second class method from the second set of class methods, wherein the second class method corresponds to the first class method, and
performing the operation on the database based on the second class method.

2. The computer-implemented method of claim 1, wherein the input from the user is received through a browser which is executing on a client and which interacts with the tenant-specific user interface.

3. The computer-implemented method of claim 2, wherein the method further comprises:
upon retrieving the tenant-specific context based on the identifier, storing the tenant-specific context in a user's session in the browser.

4. The computer-implemented method of claim 3, wherein the method further comprises identifying the tenant with which the input from the user is associated with based on extracting the tenant-specific context from the user's session while receiving the input from the user.

5. The computer-implemented method of claim 1, wherein the tenant is an application that uses the database to store data specific to the application.

6. A computer-program product for use in conjunction with a computer system, the computer-program product comprising a non-transitory computer-readable storage medium and a computer-program mechanism including:
instructions for receiving an authentication request from a user affiliated with a tenant, wherein each tenant in a set of tenants is associated with a separate database in a set of databases, and further wherein the authentication request includes an identifier corresponding to the tenant;
instructions for extracting the identifier from the authentication request;
instructions for retrieving a tenant-specific context from a hash table based on the identifier;
instructions for rendering a tenant-specific user interface to the user based on the identifier;
instructions for receiving an input from the user, wherein the input requires an operation to be performed on a database associated with the tenant in the set of databases;
instructions for obtaining, from the tenant-specific context, a tenant-agnostic service object that comprises:
a first set of class methods corresponding to a set of tenant-agnostic operations for performing on any of the set of databases; and
a tenant-specific data access object comprising a second set of class methods corresponding to a set of operations specific to the database associated with the tenant;
instructions for invoking, on the tenant-agnostic service object, a first class method from the first set of class methods,
instructions for invoking, on the tenant-specific data access object, a second class method from the second set of class methods, wherein the second class method corresponds to the first class method; and
instructions for performing the operation on the database based on the second class method.

7. The computer-program product of claim 6, wherein the input from the user is received through a browser which is executing on a client and which interacts with the tenant-specific user interface.

8. The computer-program product of claim 7, wherein the mechanism further includes:
instructions for storing the tenant-specific context in a user's session in the browser.

9. The computer-program product of claim 8, wherein the mechanism further includes instructions for identifying the tenant with which the input from the user is associated with based on instructions for extracting the tenant-specific context from the user's session while receiving the input from the user.

10. The computer-program product of claim 6, wherein the tenant is an application that uses the database to store data specific to the application.

11. A computer system, comprising:
a processor;
a memory; and
a program module, wherein the program module is stored in the memory and configured to be executed by the processor, the program module including instructions wherein the instructions include:
instructions for receiving an authentication request from a user affiliated with a tenant, wherein each tenant in a set of tenants is associated with a separate database in a set of databases, and further wherein the authentication request includes an identifier corresponding to the tenant;
instructions for extracting the identifier from the authentication request;
instructions for retrieving a tenant-specific context from a hash table based on the identifier;
instructions for rendering a tenant-specific user interface to the user based on the identifier;

instructions for receiving an input from the user, wherein the input requires an operation to be performed on a database associated with the tenant in the set of databases;

instructions for obtaining, from the tenant-specific context, a tenant-agnostic service object that comprises:
  a first set of class methods corresponding to a set of tenant-agnostic operations for performing on any of the set of databases; and
  a tenant-specific data access object comprising a second set of class methods corresponding to a set of operations specific to the database associated with the tenant;

instructions for invoking, on the tenant-agnostic service object, a first class method from the first set of class methods;

instructions for invoking, on the tenant-specific data access object, a second class method from the second set of class methods, wherein the second class method corresponds to the first class method; and instructions for performing the operation on the database based on the second class method.

12. The computer system of claim 11, wherein the input from the user is received through a browser which is executing on a client and which interacts with the tenant-specific user interface.

13. The computer system of claim 12, wherein the instructions further include:
  instructions for storing the tenant-specific context in a user's session in the browser.

14. The computer system of claim 13, wherein the instructions further include instructions for identifying the tenant with which the input from the user is associated with based on instructions for extracting the tenant-specific context from the user's session while receiving the input from the user.

15. The computer system of claim 11, wherein the tenant is an application that uses the database to store data specific to the application.

* * * * *